June 23, 1970 — F. ARLET — 3,516,186
DECORATIVE AND THE LIKE DEVICE
Filed Dec. 7, 1967
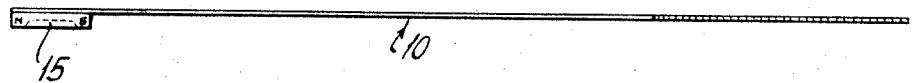
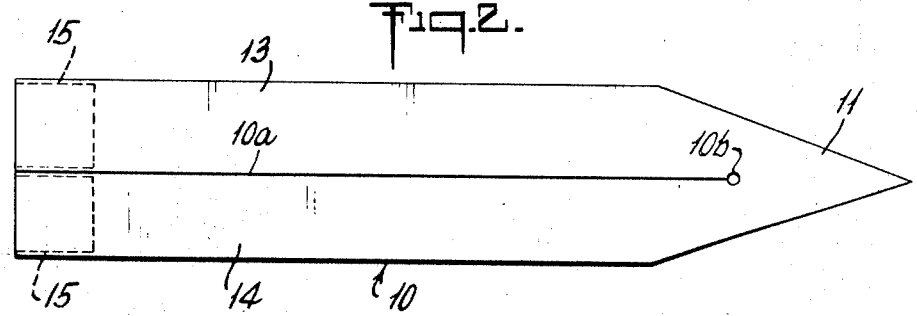
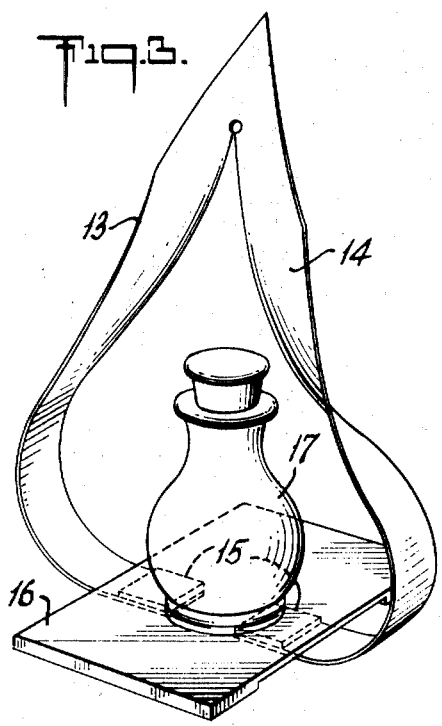
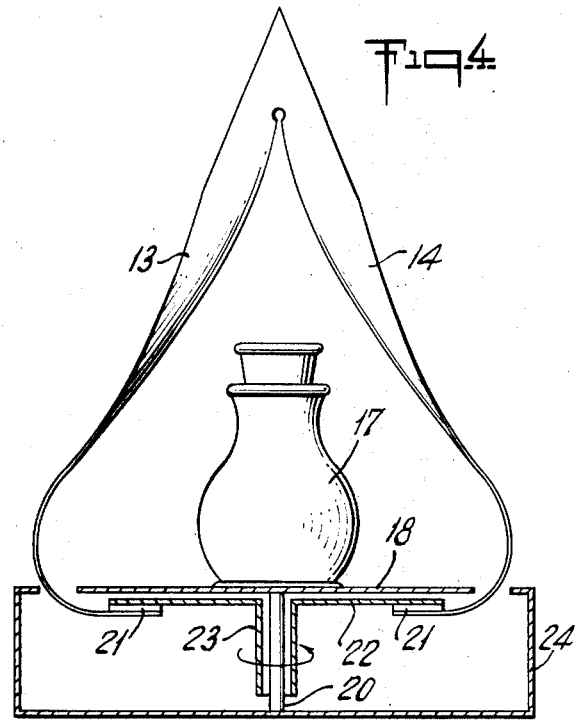
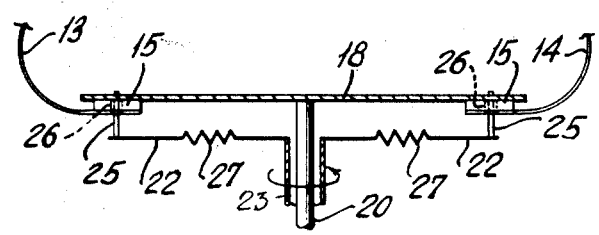
INVENTOR
FRANÇOIS ARLET
BY KARL RATH
ATTORNEY

United States Patent Office 3,516,186
Patented June 23, 1970

3,516,186
DECORATIVE AND THE LIKE DEVICE
Francois Arlet, 7 Rue d'Arsonval,
75 Paris 15eme, France
Filed Dec. 7, 1967, Ser. No. 688,904
Int. Cl. G09f 19/00
U.S. Cl. 40—126                                      7 Claims

ABSTRACT OF THE DISCLOSURE

An oblong flexible sheet of elastic material is divided into two adjacent strips by a longitudinal slit extending from a point midway of one of the short ends of the sheet to a point spaced from the opposite short end thereof, a permanent magnet element being affixed to each of the free ends of the strips, to support the strips upon a magnetic base in relatively spaced and mutually rotated relation such as to distort the strips into a desired three-dimensional configuration.

---

The present invention relates to a decorative and the like device and has for its main object the provision of a device of this type the shape or configuration of which may be varied or adjusted in a continuously variable manner, either manually or by the aid of suitable continuous operating means, to produce an animated effect for display and the like purposes.

Among the more specific objects of the invention is the provision of a device of the referred to type being especially suitable as support or pedestal for objects or products of any kind to be displayed for advertising and the like purposes.

The invention, both as to the foregoing and ancillary objects as well as novel objects thereof, will be better understood from the following description of a preferred embodiment in the form of an advertising display stand or accessory, said description being taken in conjunction with the accompanying drawing forming part of this specification and in which:

FIG. 1 is a side view of the distortable member, forming part of the invention and shown in its flat or unmounted position;

FIG. 2 is a plan view of the member shown in FIG. 1;

FIG. 3 is a perspective view, showing the member according to FIGS. 1 and 2 in its use or mounted position upon a base, to serve as a display stand or accessory according to the invention;

FIG. 4 is a front view of the device according to FIG. 3, modified to embody means to produce a continuous motion or animated effect; and FIG. 5 is a partial schematic view illustrating a modification of FIG. 4.

Like reference numerals denote like parts in the different views of the drawing.

While the device according to the invention is primarily suited for and described in the following with reference to a decorative or display device, other uses, such for instance as a modeling or sculpturing aid for artists, as an educational or instructional instrument for the search of unusual or non-figurative designs or patterns etc., will become apparent from the disclosure and as the description proceeds in reference to the drawing.

Referring more particularly to FIGS. 1 and 2, the numeral 10 denotes an oblong rectangular sheet of stainless steel or the like flexible and elastic material, including synthetic plastics, said sheet being provided, in the example shown, midway and longitudinally thereof with a slit 10a extending from one of the short ends thereof to a point spaced from its opposite end, the latter being preferably of triangular shape with the apex of the triangle in line with the slit 10a, as shown in the drawing. In other words, there are provided, as a result of the slit 10a, a pair of contiguous strips 13 and 14 disposed in a common plane and connected by an integral end portion 11.

Affixed to the adjoining free ends of the strips 13 and 14, in the example shown, are a pair of mounting elements in the form of permanent magnet plates or bars 15 magnetized to provide magnetic poles N and S, as indicated by the dotted line in FIG. 1, for cooperation with a base plate or support 16 consisting of soft magnetic material, such as iron, steel, etc., and having a supporting surface which is a substantial multiple of the surface of the magnets 15.

The member 10, in the example illustrated, is advantageously provided with an aperture 10b at the end of the slit 10a, as shown in FIG. 1.

In use, member 10, or its component strips 13 and 14, respectively, are distorted into any of its possible three-dimensional positions or configurations by suitable relative positioning of and rotation of the magnets 15, the latter being attracted against the base 16 acting as a magnetic armature, one of said positions suitable as a display stand or accessory being shown in FIG. 3. The object to be displayed may be of any kind, such as a perfume bottle 17 shown for illustration in the drawing. It can be readily seen, in the case shown and with the magnets 15 spaced by a predetermined distance crosswise of the plate or support 16, that they have been relatively rotated within the common plane thereof by an angle of 90° from their normal position of FIG. 2, to result in the symmetrical shape or configuration of the strips 13 and 14, as shown in the drawing.

It is thus possible, in the manner shown and described, by varying the relative spacing between and/or mutual orientation of the magnets 15, to change the spacial configuration of the strips, or equivalent elastic and flexible member 10, respectively, in an ever changing manner. For this purpose, the magnets may be relatively rotated within their common plane, or turned about an axis by 180° and, furthermore, they may be positioned upon either the same or the opposite faces of the supporting member 16, to increase the number of possible spacial configurations of the strips 13 and 14, or equivalent flexible member 10.

According to a modified construction, magnets 15 may be affixed to both sides of the strips 13 and 14, or equivalent elastic member, to facilitate mounting upon the same or opposite sides of the base 16.

Alternatively, the magnets or equivalent mounting elements 15 may consist of soft magnetic material, to act as armatures in cooperation with the base 16 being permanently magnetized in a suitable manner, to firmly support the strips, or the like flexible member, by magnetic attraction between the base 16 and elements 15, in a desired position or configuration.

Furthermore, the flexible member may have any desired shape, differing from that shown for illustration, and may be fitted with more than two mounting elements or magnets, to enable additional spacial variations in the mounted position. Thus, in the case of FIG. 2, an additional magnet may be provided at the end 11 of the member 10, the latter in this case having a sufficient length, to increase the number of spacial variations of the device.

While the distortable member 10 is shown in the form of a strip, it is understood that it may have any other suitable shape or configuration such as to provide at least two edge or end zones variable spacing and/or mutual orientation of which results in the member assuming a variety of varying spacial equilibrium positions or configurations. According to the present invention, the flexible member is fitted with suitable mounting elements affixed to said zones for the positioning of same upon a support or base in any of its possible spacial configurations, in the manner described and disclosed herein. Besides, the member 10 may be smooth, perforate, or otherwise conditioned or colored, to provide additional visual and special effects, especially for use as a display device.

FIG. 4 shows an arrangement for continuously rotating the device according to FIG. 3, to provide an animated effect as a display device. For the latter purpose, the ends of the strips 13 and 14 are secured, by way of intermediate mounting elements 21, to a rotating platform 22 having a hollow central shaft 23 driven by an electric motor (not shown), as indicated by the arrow in the drawing. A stationary support 18 for the bottle 17 or the like object to be displayed is mounted upon a post 10 acting as a bearing for the shaft 23 and the entire operating mechanism enclosed in a housing 24.

While in FIG. 4 both mounting elements are relatively fixed and rotated in unison in the same direction, they may be relatively movable, to continuously vary the shape or spacial configuration of the device, such as by an arrangement indicated, by way of example in FIG. 5. In the latter, the strips 13 and 14 have affixed thereto magnets 15 in the manner described and held against the support 18 by magnetic force or attraction. The magnets may be displaced back and forth and in opposite directions by the shaft 23 through suitable slot and pin connections 25, 16 connected to said shaft through flexible links 27

In the foregoing the invention has been described in reference to an exemplary illustrative device. It will be evident, however, that variations and modifications, as well as the substitution of equivalent elements for those shown herein for illustration, may be made without departing from the broader purview and spirit of the invention as defined by the appended claims. The specification and drawing are accordingly to be regarded in an illustrative rather than in a restrictive sense.

I claim:
1. A device of the character described comprising in combination:
    (1) a flexible member of elastic material comprised of a pair of strips normally contiguous to one another in a common plane and connected at one of the short ends thereof,
    (2) a pair of mounting elements affixed each to the free end of one of said strips, and
    (3) a support including means for variably positioning thereon said elements in relative spaced relation,
    (4) whereby to distort said strips into a three-dimensional configuration by variation of the spacing distance and relative rotation of said elements.

2. A device as claimed in claim 1, said last means comprised of magnetic means, to support said elements by magnetic attraction therebetween and said base.

3. A device as claimed in claim 1, said elements being constituted by permanent magnets and said base consisting of soft magnetic material, to support said elements by magnetic attraction therebetween and said base.

4. A device as claimed in claim 1, said supporting means including at least one continuously moving carrier supporting at least one of said elements, to displace the same relative to the other element.

5. A device as claimed in claim 1, said supporting means including a continuously moving carrier for said elements arranged in predetermined relative spacing and orientation to one another.

6. A device as claimed in claim 1, wherein said member consists of an oblong sheet having a slit extending longitudinally from a point midway of one of the short ends to a point spaced from the opposite short end of the sheet.

7. A device as claimed in claim 1, wherein said member consists of an oblong sheet having a straight short end and an opposite triangular end portion and being provided with a slit extending longitudinally from a point midway of said straight short end to a point spaced from said triangular end portion of said sheet.

References Cited
UNITED STATES PATENTS

| 698,838 | 4/1902 | Inhof | 40—124.1 |
|---|---|---|---|
| 2,960,786 | 11/1960 | Wagner. | |
| 3,432,953 | 3/1969 | Pinzke | 40—124.1 |

EUGENE R. CAPOZIO, Primary Examiner

W. J. CONTRERAS, Assistant Examiner

U.S. Cl. X.R.

40—124.1